United States Patent Office 3,429,941
Patented Feb. 25, 1969

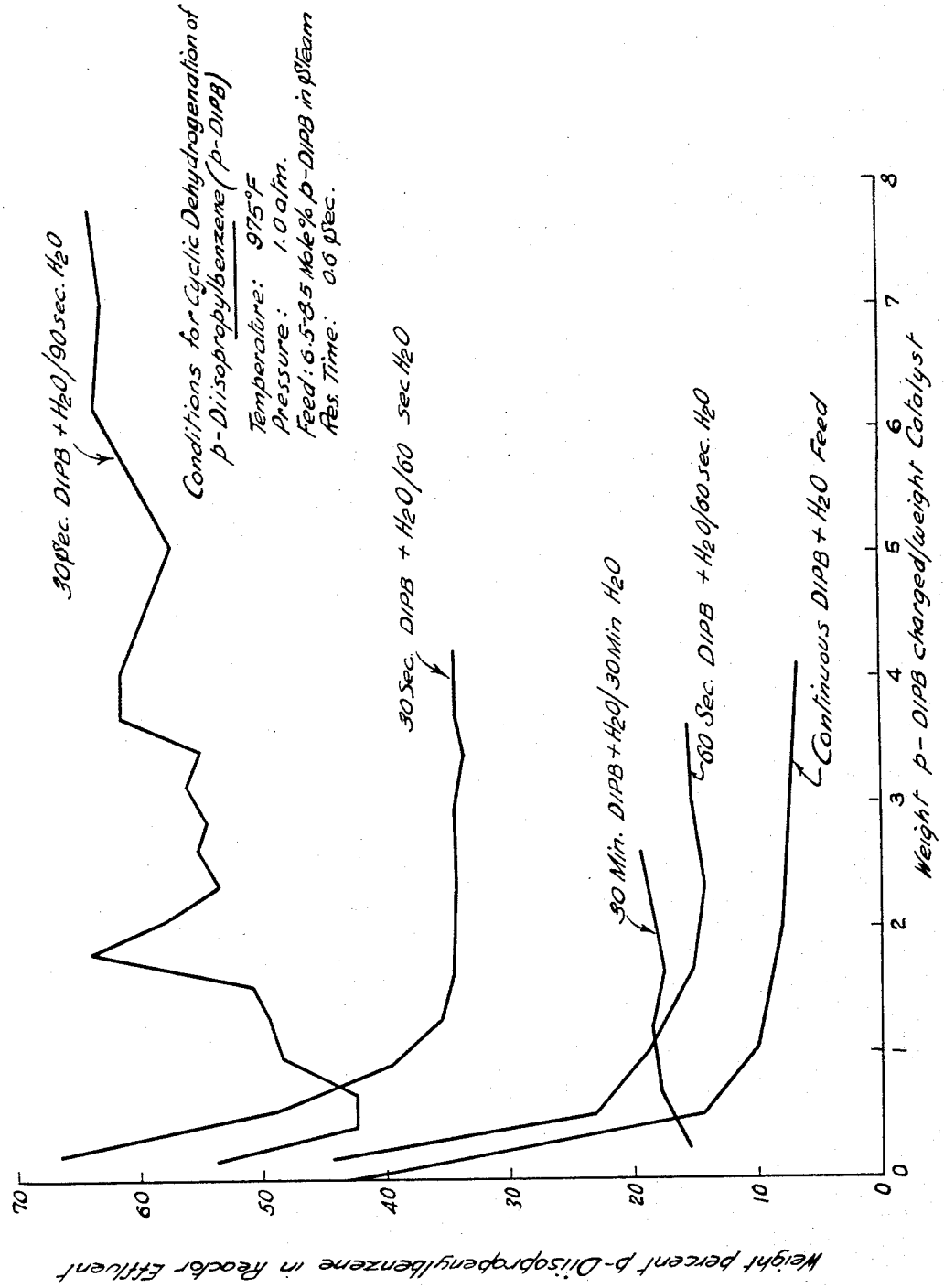

3,429,941
SHORT CYCLE CATALYTIC CONVERSION
OF HYDROCARBONS
Edwin R. Kerr, Wappingers Falls, Charles H. Ware, Jr., Poughkeepsie, and William D. Stepanek, Fishkill, N.Y., assignors to Texaco Inc., New York, N.Y., a corporation of Delaware
Filed Sept. 27, 1967, Ser. No. 671,066
U.S. Cl. 260—669         5 Claims
Int. Cl. C07c 5/18, 15/02

ABSTRACT OF THE DISCLOSURE

Hydrocarbons are catalytically dehydrogenated in a two period cyclic operation alternating between a reaction period of less than 60 seconds and a regeneration period 1.25 to 5 times longer than the process period.

Background of the invention

This invention relates to improvements in the catalytic conversion of hydrocarbons. More particularly, it relates to improvements in the catalytic treatment of hydrocarbons wherein the catalyst loses activity but is regenerated for reuse in the process. More particularly, this invention relates to a short cycle catalytic process for dehydrogenating polyalkyl aromatics, such as diisopropylbenzene.

It is well know that saturated aliphatic hydrocarbons and alkyl aromatic hydrocarbons can be converted to unsaturated hydrocarbons by catalytic dehydrogenation. A wide variety of catalytic systems and processes have been developed for the production of olefins. Large quantities of butadiene and styrene have been produced by such dehydrogenation processes. Although the decline in catalyst activity often requires periodic reactivation of the catalyst, what is normally a cyclic operation can be made a continuous one through the use of multiplicity of vessels and the necessary piping connections and valving. In addition, these processes are often operated adiabatically with the heat balance requirement being maintained between the endothermic dehydrogenation of the hydrocarbon during the reaction period and the exothermic release during the regeneration portion of the cycle.

In the catalytic dehydrogenation the activity of the catalyst generally declines due to the formation of polymers and coke on the surface of the catalyst. Periodically, therefore, processing of the hydrocarbon stream must be terminated and the catalyst bed replaced or regenerated. Air blowing at temperatures of 1000 to 1100° F. or steaming at high temperatures are techniques employed by the prior art to return a dehydrogenation catalyst to its former activity levels. In some instances, catalytic activity may remain sufficiently high during dehydrogenation to permit the use of a catalyst bed for as long as six months before replacement or regeneration of the catalyst is necessary. In other instances, frequent regeneration is necessary to maintain the catalyst activity at a high level. The necessity for regeneration is of course dictated by many factors including the specific catalyst employed, feed stock quality or condition, the product desired and the overall economics of the process being employed.

The dehydrogenation of hydrocarbons is most favorably conducted at lower pressures. This is often achieved by maintaining the reactant at a low partial pressure through the use of vacuum or diluent gases. Commercially, the addition of large volumes of steam achieve the desired low partial pressure for the hydrocarbon although this requires that the catalyst be substantially unaffected by water. Since a alumina-chromia catalyst, which is a superior dehydrogenation catalyst, is poisoned by water, vacuum or diluent gases other than steam must be employed with this catalyst. A catalyst of iron oxide in combination with $Cr_2O_3$ and $K_2CO_3$ was developed for use when operating with diluent steam. This catalyst is marketed under the trade names "105 catalyst" by Shell Chemical Corp. and "Girdler G–64" by Chemetron Corp. Not only is this catalyst unaffected by steam, the presence of the steam apparently prolongs an operating run by retarding coke and carbon formation. An additional advantage of this particular catalyst is that steam may be used to regenerate the catalyst when coke and carbon formation preclude further dehydrogenation of the hydrocarbon.

It is know that hydrocarbons may be catalytically dehydrogenated by ulsing the feed into an inert vaporous carrier. However the importance of the duration of both the "on" and "off" periods was undetermined. Further it was not discovered that with a particular ratio of "on"-"off" periods and by employing steam as the diluent regeneration of the catalyst could be achieved during the "off" period.

Summary of the invention

We have found that in the catalytic dehydrogenation of polyalkyl armoatic hydrocarbons, such as diisopropylbenzene, with a $Fe_2O_3$-$Cr_2O_3$-$K_2CO_3$ type catalyst, the activity of the catalyst may be substantially maintained at its initial activity level by employment of the short cycle operation of our invention. This short cycle operation consists of a reaction period and a regeneration period wherein the reaction period is maintained below 60 seconds and the regeneration period is 1.25 to 5 times longer than the process period. Ideally the reaction period should be maintained for about 30 seconds while the regeneration period should last for about 90 seconds.

Olefins and diolefins produced by catalytic dehydrogenation of hydrocarbons are useful as feed stocks for such processes as polymerization, and the manufacture of detergents and alkylates.

By using the short cycle technique of our invention the initial activity of a regenerable dehydrogenation catalyst may be substantially maintained.

Brief description of the drawing

The present invention will be more readily understood by reference to the accompanying drawing which is a graphical presentation of the results of several catalytic dehydrogenation processes including that of the present invention.

Description of the preferred embodiments

In catalytic dehydrogenation of hydrocarbons the catalyst is often present in the system as a fixed bed with the hydrocarbon stream passing in contact with it continuously. The depth of the fixed bed and the space velocity of the reactants are such that the hydrocarbon stream often remains in contact with the catalyst for about 0.1 to 10 seconds. During the dehydrogenation reaction, carbon as well as condensed or polymeric hydrocarbons forms in small quantities and often condenses on the surface of the catalyst. After extended periods of time at high temperature these materials are transformed into coke-like depositions. The carbon, the condensed or polymeric hydrocarbons and the resultant coke inhibit the action of the catalyst and gradually reduce its activity. Removal of these materials usually returns the catalyst to its initial activity. While the carbon and condensed material may be easily removed shortly after their deposition on the catalyst, the coke which they produce after an extended processing run is removed only by a prolonged and often vigorous regeneration. However, in some instances when the catalyst is regenerated shortly after the deposition of these materials on the catalyst surface, the removal may be achieved quite readily and easily by a high temperature gas sweep.

Our invention is useful in the catalytic dehydrogenation of $C_2$ and $C_3$ polyalkyl aromatic hydrocarbons to produce mono and di-olefins wherein the hydrocarbon, mixed with a diluent stream of high temperature steam, is passed in contact with a bed of steam regenerable, promoted, iron oxide catalyst such as a $Fe_2O_3$-$K_2CO_3$-$Cr_2O_3$ catalyst combination. Among the $C_2$ and $C_3$ polyalkyl aromatic hydrocarbons which may serve as feedstocks in the process are the $C_2$ and $C_3$ polyalkylbenzenes. Such representative compounds as diisopropylbenzene, triisopropylbenzene, diethylbenzene, triethylbenzene, ethylisopropylbenzene and ethyldiisopropylbenzene may be dehydrogenated by the process of our invention. The short cycle process of our invention is particularly useful when employing as the feed stock diisopropylbenzene, including its three isomers, alone or in combination.

In general, our invention is practiced by use of a short cycle process comprising a reaction period and a regeneration period wherein the reaction period is less than one minute and the regeneration period is 1.25 to 5 times longer than the reaction period. This may be accomplished by continuously passing steam, which serves both as the hydrocarbon diluent and the regeneration medium, through the catalyst bed and pulsing the hydrocarbon into the steam during the short reaction period.

We have found that a polyalkylbenzene, particularly any of the three isomers of diisopropylbenzene, may advantageously be dehydrogenated in the presence of a steam regenerable, ferric oxide-chromic oxide-potassium carbonate catalyst by the short cycle process of our invention under specific operating conditions. The process is conveniently conducted by passing steam through the catalyst bed continuously with the diisopropylbenzene introduced into the steam during the reaction period. We find that the hydrocarbon feed concentration in the steam-hydrocarbon mixture should be between 1 and 15 mole percent, with a 5 to 7 mole percent concentration being preferred. Higher hydrocarbon feed concentrations may be used with a proportionate reduction in the reaction portion of the cycle. Atmospheric pressure in the reaction vessel is preferred but higher or lower pressures may be employed; the steam flow will have to be adjusted accordingly to maintain the hydrocarbon partial pressure in the feed stream between 0.01 and 0.15 atmosphere and preferably between 0.05 and 0.07 atmosphere. Operating temperatures should be maintained at 800 to 1200° F. with 975 to 1125° F. being preferred. The time the feed is in contact with the catalyst is important. Although the reaction may be conducted with a residence time of the reactant within the catalyst bed of 0.1 to 1 second, we prefer to limit it to 0.15 to 0.35 second. Both the length of the reaction period and the ratio of the regeneration period to the reaction period are important variables and are interrelated. Although we find that the reaction period should be no longer than one minute it should nevertheless be longer than ten seconds. Within this range we prefer a reaction period of twenty to forty seconds. The regeneration period should always be longer than the reaction period and should be in a ratio to the reaction period of between 1.25:1 and 5:1, although we prefer to operate with a ratio of between 2:1 and 4:1 with a 3:1 ratio being particularly preferred. Therefore with a twenty second reaction period, a one hundred second regeneration period would prove operable. Likewise a combination of forty-five seconds to seventy-five seconds is within the preferred conditions. Although a variety of process conditions are operable, those skilled in the art will appreciate that the particular conditions selected will be dictated by the feedstock, and the product and selectivity desired.

The following is a description by way of example of methods of carrying out the process of the present invention.

Example I

In a series of runs the dehydrogenation of p-diisopropylbenzene was used to demonstrate the advantages of the process of our invention over other dehydrogenation processes and processing sequences.

p-Diisopropylbenzene was dehydrogenated to p-diisopropylbenzene in the presence of fixed catalyst bed of a $Fe_2O_3$-$Cr_2O_3$-$K_2CO_3$ catalyst, marketed by Chemetron Corp. under the name "Girdler G–64." In all instances the feed stream consisted of p-diisopropylbenzene mixed with steam. Runs were made at 975° F., atmospheric pressure, a 6.5 to 8.5 mole percent concentration of hydrocarbon in the steam-hydrocarbon mixture and a residence time in the catalyst bed of 0.6 second.

In the first run the p-diisopropylbenzene plus steam was charged continuously through the catalyst bed with no regeneration. The rest of the runs used a cyclic operation consisting of charging the hydrocarbon plus steam for a fixed period of time followed by a fixed period for steam regeneration of the catalyst. The following reaction periods/regeneration periods were studied: 30 min./30 min.; 60 sec./60 sec.; 30 sec./60 sec.; and 30 sec./90 sec.

The results of this series of runs are shown in the drawing wherein the weight percent of product in the reactor effluent is plotted against the weight of hydrocarbon charged per weight of catalyst. The bottom curve of the drawing shows the rapid catalyst deactivation experienced when p-diisopropylbenzene (referred to as p-DIBP in the drawing) and steam were charged continuously without any regeneration of the catalyst; the concentration of the desired diolefin in the product stream declined very rapidly with time onstream. Cyclic operation consisting of a reaction period of 30 minutes followed by a 30 minute regeneration period showed slightly superior results. Although no further improvement was observed by operating with a 60 second process period and a 60 second regeneration period, a significant improvement was attained with an unbalanced cycle of a 30 second reaction period and a 60 second regeneration period. Although the catalyst in this run had an initial high activity it declined rapidly to a steady state activity which was of higher magnitude than the previous runs.

The last run, and the one illustrating the preferred process of our invention, employed a 30 second reaction period and a 90 regeneration period. The graph illustrative of this run shows that the catalyst activity showed little if any deactivation and in fact appeared to be somewhat more active during the latter part of the run than in the initial stages.

The benefits of short cycle operation are shown further in Table I below wherein the conversion, selectivity and productivity for the steady state activity periods of the above runs are listed. Conversion, in this instance, is defined as the moles of DIPB converted per 100 moles of DIPB charged; selectivity is defined as the moles of DIPB converted to a specific product per 100 moles DIPB converted and productivity is defined as the weight of diisopropenylbenzene formed per weight of catalyst per hour onstream (including both reaction and regeneration periods). It can be seen from this table that the short cycle operation of our invention gives higher selectivity and productivity than other cyclic periods or steady state operation as well as less intermediate product formation as shown by the isopropylcumene selectivity. Surprisingly the 30 second/90 second run where only 25 percent of the onstream time is used for the dehydrogeneration reaction exhibited a productivity almost twice that of the continuous dehydrogeneration run.

It is thought that the unexpected improvements resulting from the short cycle operation of our invention are attributable to the fact that the catalyst is never allowed to become deactivated or coked. The condensed or polymeric hydrocarbons which form on the catalyst sites in the process period of the cycle are immediately removed by the steam in the regeneration portion of the cycle. If allowed to remain on the catalyst for extended periods of time at high temperatures, these deposited materials would be transformed into coke.

Example II

In two runs the process of our invention was demonstrated with para and meta diisopropylbenzene under similar conditions. Both runs were conducted as in Example I under the same conditions with the same catalyst viz; temperature of 975° F., atmosphere pressure, reaction TABLE I.—DEHYDROGENATION OF p-DIISOPROPYL-BENZENE

| Process cycle p-DIPB + steam/steam | Conversion (percent) | Selectivity (percent) | | Diisopropenyl-benzene productivity |
|---|---|---|---|---|
| | | p-Isopropenyl-cumene | p-Diisopropenyl-benzene | |
| Continuous feed, no regeneration | 37.6 | 51.8 | 21.7 | 0.080 |
| 30 min./30 min | 53.6 | 39.2 | 32.6 | 0.083 |
| 60 sec./60 sec | 51.3 | 41.5 | 28.3 | 0.089 |
| 30 sec./60 sec | 69.9 | 27.2 | 45.0 | 0.098 |
| 30 sec./90 sec | 86.4 | 12.3 | 62.9 | 0.134 | period of 30 seconds, regeneration period of 90 seconds, residence time in catalyst bed of 0.6 second and a Girdler G–64 catalyst of $Fe_2O_3$-$Cr_2O_3$-$K_2CO_3$. Steam was continuously passed through the bed with the hydrocarbon "pulsed" into the steam for 30 second intervals separated by the 90 second regeneration periods.

In the first run there was 7.3 mole percent of p-diisopropylbenzene in the feed and during the second run m-diisopropylbenzene constituted 6.9 mole percent of the hydrocarbon-steam process stream. The results of these runs are set forth in Table II below.

TABLE II

| DIPB Isomer in feed | Para | Meta |
|---|---|---|
| Conversion, percent | 86.4 | 93.9 |
| Selectivity, percent: | | |
| Isopropenylcumene | 12.3 | 7.7 |
| Diisopropenylbenzene | 62.9 | 61.9 |
| Productivity of diisopropenylbenzene | 0.134 | 0.133 |

From the above data it is seen that the short cycle process of our invention may advantageously be employed to catalytically dehydrogenate para or meta diisopropylbenzene with little significant difference in the selectivity or productivity of the diolefin.

Obviously many modifications and variations of the invention, as hereinbefore set forth, may be made without departing from the spirit and scope of this invention. Therefore only such limitations should be imposed as are indicated in the claims set forth below.

We claim:
1. A process for catalytically dehydrogenating a $C_2$-$C_3$ polyalkylbenzene, wherein the process consists of alternating between a reaction period and a regeneration period, which comprises:
   (a) passing a mixture of steam and polyalkylbenzene in contact with a steam regenerable, dehydrogenation catalyst under dehydrogenation conditions for between 10 and 60 seconds and
   (b) then, passing steam in contact with the catalyst under regeneration conditions, the ratio of the length of the regeneration period to the length of the reaction period being between 1.25 and 5.0.
2. A process according to claim 1 wherein:
   the polyalkylbenzene is a dialkylbenzene selected from the group consisting of diisopropylbenzene, diethylbenzene, and ethylisopropylbenzene;
   the catalyst is a $Fe_2O_3$-$Cr_2O_3$-$K_2CO_3$ combination;
   the partial pressure of the dialkylbenzene in the mixture is 0.01 to 0.15 atmosphere; and
   the dehydrogenation conditions comprise a temperature of 800–1200° F. and a residence time of 0.1 to 1 seconds
3. A process according to claim 2 wherein the dialkylbenzene is diisopropylbenzene; the reaction period is 20 to 45 seconds and the regeneration period is 75 to 100 seconds.
4. A process according to claim 2 wherein the partial pressure of the dialkylbenzene in the mixture of 0.05 to 0.07 atmospheres:
   the dehydrogenation conditions comprise a temperature of 975 to 1125° F. and a residence time of 0.15 to 0.35 second; and
   the ratio of regeneration period to reaction period is between 2:1 and 4:1.
5. A process according to claim 4 wherein the dialkylbenzene is diisopropylbenzene and the ratio is 3:1.

References Cited

UNITED STATES PATENTS

| 2,376,709 | 5/1945 | Mattox | 260—669 |
| 2,397,218 | 3/1946 | Sturgeon | 260—669 |
| 3,100,234 | 8/1963 | Lee | 260—669 |
| 3,243,472 | 3/1966 | Dinwiddie | 260—680 |

DELBERT E. GANTZ, *Primary Examiner.*

CURTIS R. DAVIS, *Assistant Examiner.*